US009767477B2

(12) United States Patent
Greenzeiger et al.

(10) Patent No.: US 9,767,477 B2
(45) Date of Patent: Sep. 19, 2017

(54) ACCIDENTAL SELECTION OF INVITATIONAL CONTENT

(71) Applicant: Apple Inc., Cupertino, CA (US)

(72) Inventors: Michael Froimowitz Greenzeiger, Sunnyvale, CA (US); Steven C. Bredenberg, Campbell, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 13/863,848

(22) Filed: Apr. 16, 2013

(65) Prior Publication Data

US 2014/0310091 A1  Oct. 16, 2014

(51) Int. Cl.
  *G06Q 30/02* (2012.01)
  *G06F 3/0482* (2013.01)
  *G06F 3/0484* (2013.01)

(52) U.S. Cl.
  CPC ....... *G06Q 30/0242* (2013.01); *G06F 3/0482* (2013.01); *G06F 3/04842* (2013.01); *G06Q 30/0246* (2013.01)

(58) Field of Classification Search
  None
  See application file for complete search history.

(56) References Cited

U.S. PATENT DOCUMENTS

| | | | |
|---|---|---|---|
| 5,808,601 A * | 9/1998 | Leah et al. ................. | 715/856 |
| 6,295,049 B1 * | 9/2001 | Minner ............... | G06F 3/04842 |
| | | | 345/157 |
| 6,559,873 B1 * | 5/2003 | Dawkins ............... | G06F 3/0482 |
| | | | 715/856 |
| 8,015,509 B2 | 9/2011 | Karstens | |
| 9,170,705 B1 * | 10/2015 | Kelm ................. | G06Q 30/0256 |
| 2003/0080946 A1 * | 5/2003 | Chuang ................. | G06F 3/0418 |
| | | | 345/173 |
| 2006/0224994 A1 * | 10/2006 | Cheemalapati et al. ...... | 715/808 |
| 2007/0067303 A1 | 3/2007 | Linjama et al. | |
| 2008/0097842 A1 * | 4/2008 | Tirumala et al. ............... | 705/14 |
| 2009/0251406 A1 * | 10/2009 | Seibert et al. ................ | 345/156 |
| 2012/0280917 A1 | 11/2012 | Toksvig et al. | |

(Continued)

OTHER PUBLICATIONS

Ari Juels, "Combating Click Fraud Via Premium Clicks", SS'07 Proceedings of 16th USENIX Security Symposium on Security Symposium Article No. 2, 2007.

*Primary Examiner* — Xiao Wu
*Assistant Examiner* — Steven Elbinger
(74) *Attorney, Agent, or Firm* — Polsinelli LLP

(57) ABSTRACT

The disclosed technology addresses the need in the art for determining whether a selection of an invitational content item was accidental or intentional based on selection signals that describe the selection. For example, a selection signal can be a selection point, response time, multiple selection count, context of the selection, user preference data, etc. A response to the selection can be based on whether the selection was determined to be accidental or intentional. If the selection was determined to be intentional, the response can be the regular response associated with selection of the invitational content item, i.e. registering the selection for billing and presenting secondary content to the user. If the selection was determined to be accidental, the selection can be ignored. Thus, the selection would not register for billing purposes and secondary content would not be presented to the user.

21 Claims, 10 Drawing Sheets

(56) References Cited

U.S. PATENT DOCUMENTS

2013/0113720 A1* 5/2013 Van Eerd et al. ............ 345/173
2013/0201129 A1* 8/2013 Inamoto .............. G06F 3/04886
                                                                              345/173
2014/0188606 A1* 7/2014 Moore ............... G06Q 30/0251
                                                                              705/14.53

* cited by examiner

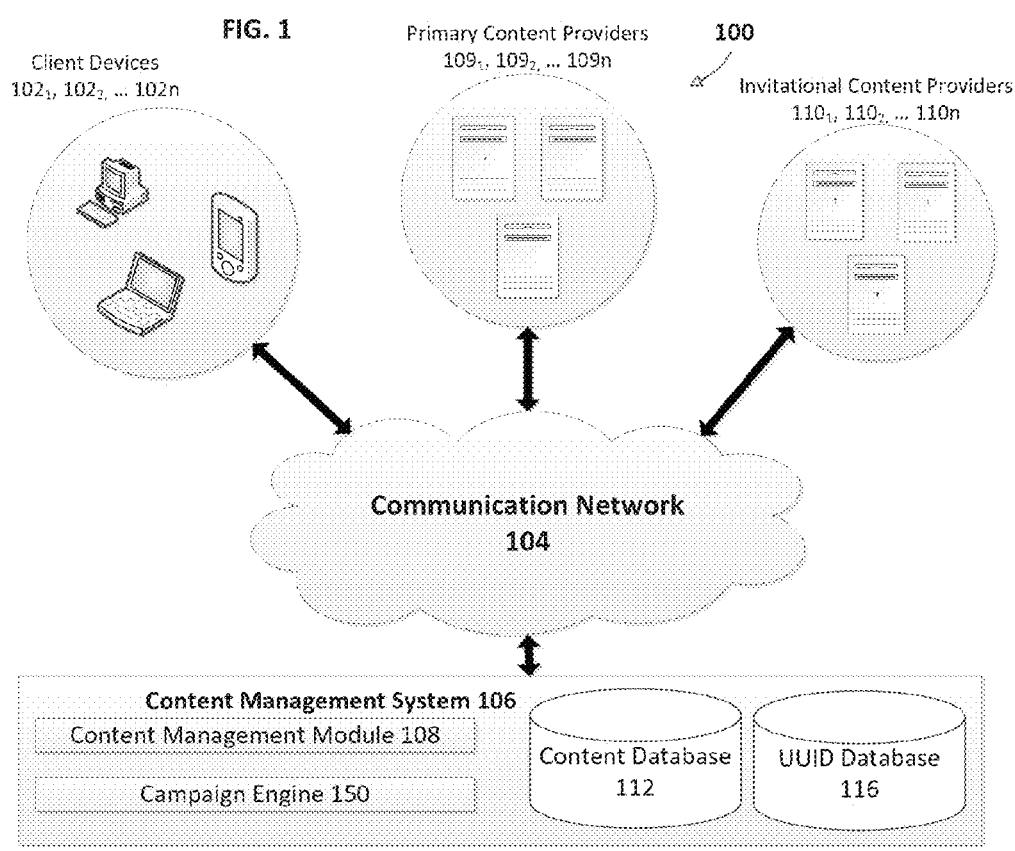

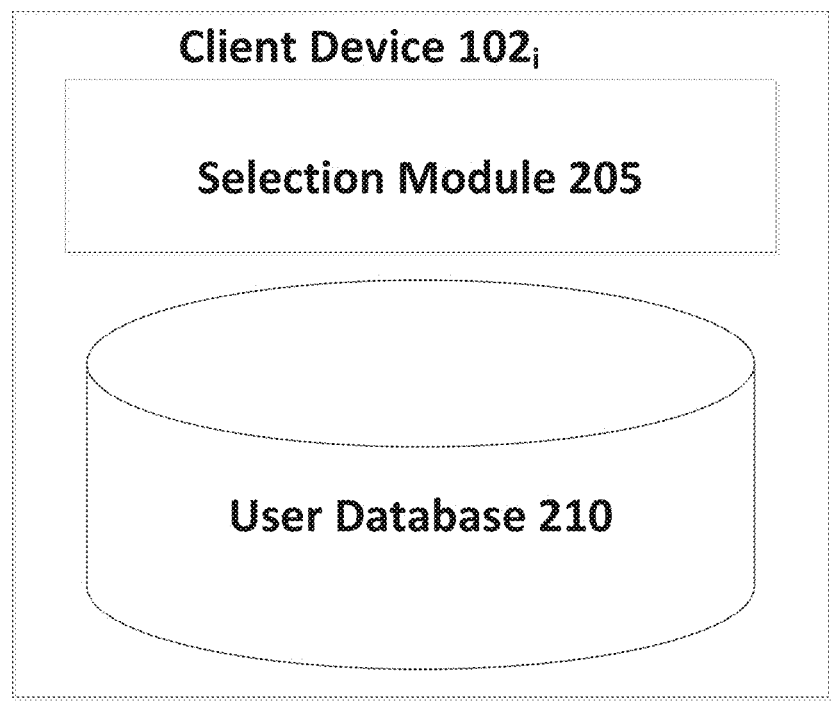

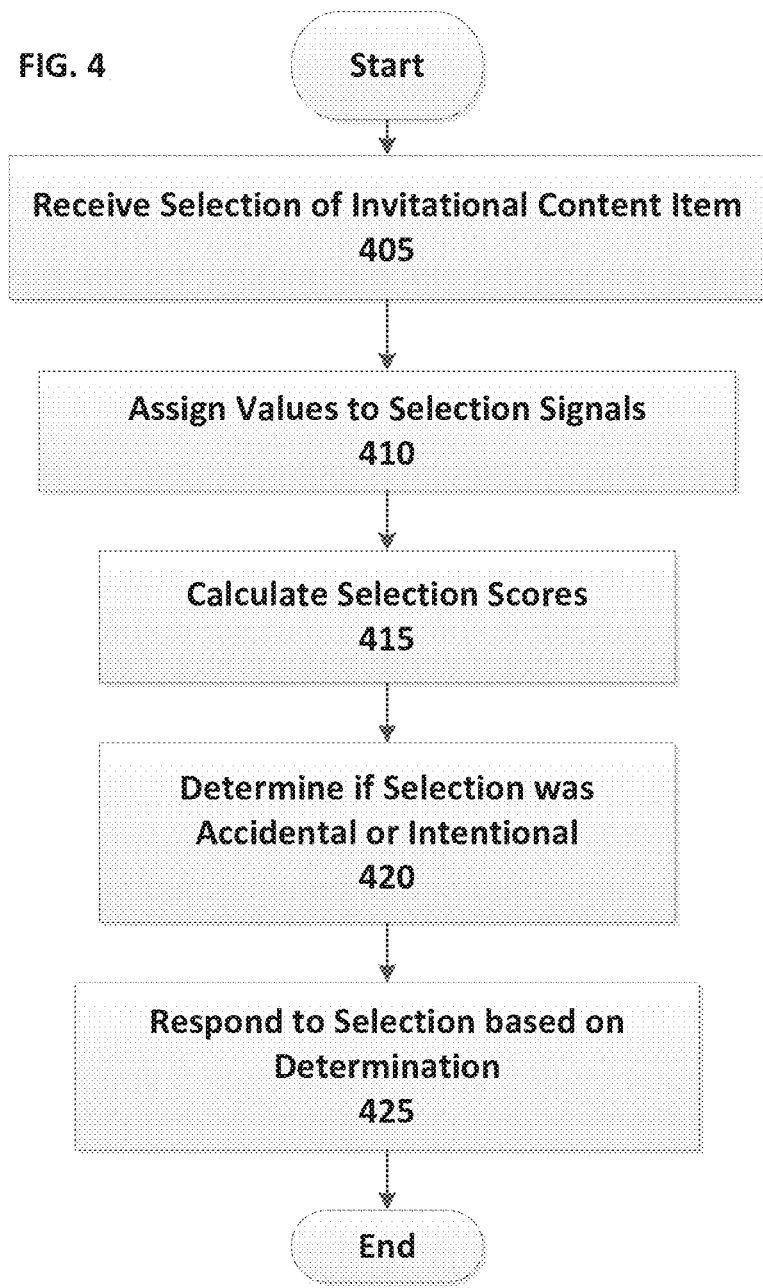

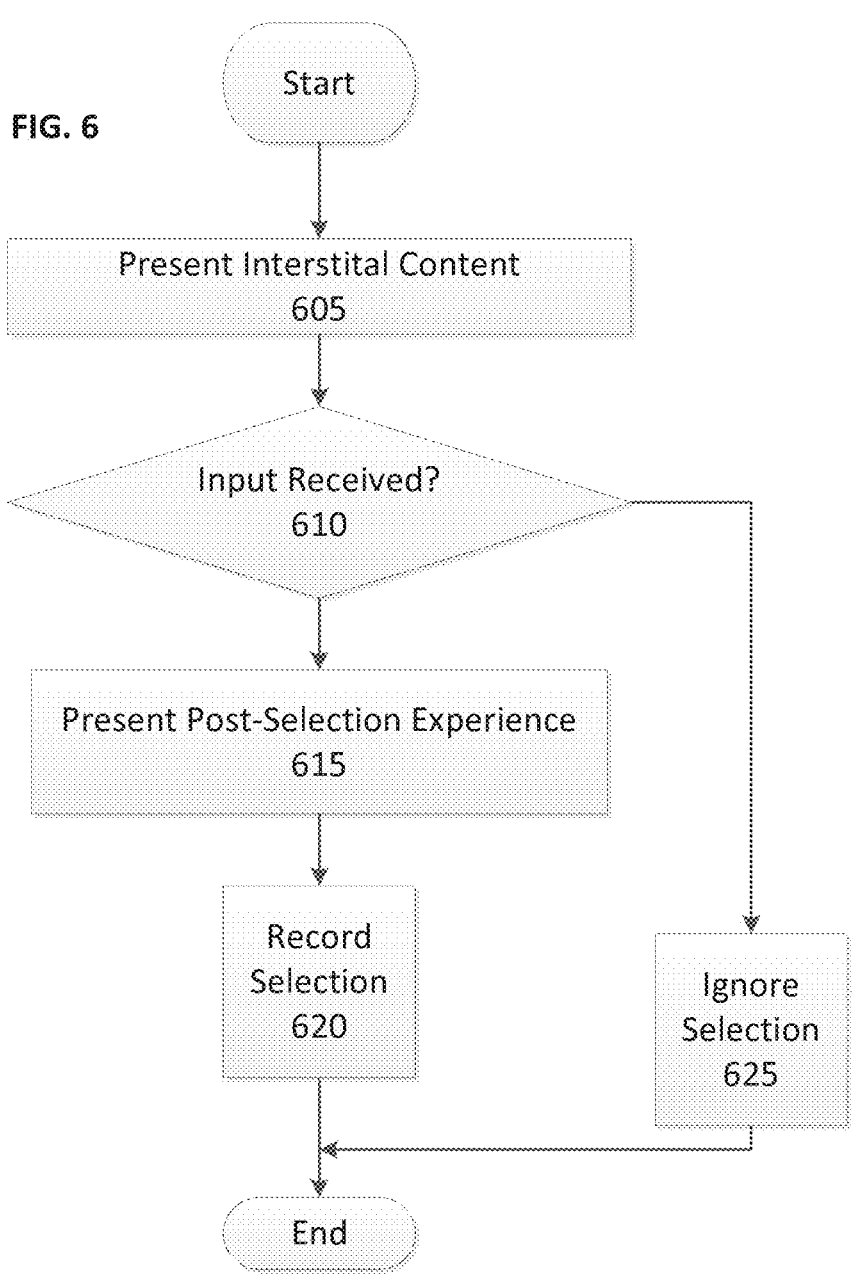

ACCIDENTAL SELECTION OF INVITATIONAL CONTENT

TECHNICAL FIELD

The present disclosure relates to invitational content items and more specifically to identifying accidental selection of invitational content items.

BACKGROUND

Invitational content items such as online banner advertisements are becoming a much more common form of advertisement because they allow users to immediately interact with the advertisement to view more information regarding an advertised product. These types of invitational content items are often priced based on how many times the invitational content item is selected. For example, an advertiser can be charged a set price for each click the advertiser's online banner advertisement receives. While selection of the invitational content item is a common metric used in pricing, studies have indicated that a significant proportion of these selections are, in fact, accidental selections by a user.

Moreover, the problem of accidental selection is thought to be even greater when invitational content items are presented on the smaller screens of mobile devices such as smartphones, tablet PCs, etc. In addition to smaller screens that can cause accidental selections, smaller devices are also more likely to be subjected to random perturbations due to being carried in a user's hand, pocket, etc., which can lead to additional accidental selections.

The problem of accidental selections is further exacerbated by less reputable publishers that may actually attempt to make it easier for users to accidentally select an invitational content item by crowding the invitational content item as closely as possible to other widely selected areas or otherwise confusing the user. Accidental selection of content items is not desirable for the advertisers that must pay for each accidental selection. Advertisers would prefer a true gauge of user interest and the knowledge that their advertisement dollars are being spent as much as possible on real interactions with their target audience, rather than accidental selections.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining whether a selection of an invitational content item was intentional or accidental. A response to the selection of the invitational content item can be based on whether the selection was determined to be intentional or accidental. For example, when a selection is determined to be intentional, secondary information regarding the invitational content can be returned in response to the selection of the invitational content item. Alternatively, a selection determined to be accidental can be ignored such that no action is performed in response to the selection and the selection is not recorded for billing purposes.

Determining whether a selection of an invitational content item was intentional or accidental can be based on various selection signals describing the selection of the item of invitational content item.

In some embodiments, a selection signal can indicate the location of a selection on the invitational content item. For example, the selection signal can indicate the point on the content item where the user selection was made. A determination as to whether the selection was intentional or accidental can based on the location of the selection. For example, when the selection point indicates that the selection was made at a position near the edge of the invitational content item, it can be determined that the selection was accidental. Conversely, when the selection point indicates that the selection made near the center of the invitational content item, a determination can be made that the selection was intentional.

In some embodiments, a selection signal can include a response time of the selection. For example, the response time can indicate the amount of elapsed time between presentation of the invitational content item and the selection of the invitational content item. When the response time is less than a predetermined amount of time, a determination can be made that the selection was accidental. Conversely, when the response time is greater than a predetermined amount, a determination can be made that the selection was intentional.

In some embodiments, a determination as to whether a selection was accidental or intentional can be based on multiple selection signals. For example, each selection signal can be assigned a score based on whether the selection signal indicates that the selection is likely accidental or likely intentional. The assigned scores can be used to calculate a selection score indicating whether the selection was accidental or intentional.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates an exemplary configuration of devices and a network in accordance with the invention;

FIG. 2 illustrates an exemplary system embodiment of a client device configured to determine if a user selection of an invitational content item was accidental or intentional;

FIG. 4 illustrates as exemplary method embodiment of determining whether a selection of an invitational content item was intentional or accidental

FIG. 6 illustrates an exemplary method embodiment of responding to a selection.

DESCRIPTION

Figure 3A:
FIGS. 3A-3D illustrate determining whether a selection was intentional or accidental based on the selection point of the selection.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for determining whether a selection of an invitational content item was accidental or intentional. For example, a user can select an invitational content item by clicking on the invitational content item presented on a client device. In some instances, the selection may be the result of an accidental click caused by, for example, a user's attempt to click something presented near the invitational content item or, alternatively, an inadvertent click when the client device is in the user's pocket. These accidental selections can result in reporting data that does not accurately reflect the impact of the invitational content item on users.

A determination as to whether a selection was accidental or intentional can be based on selection signals that describe the selection. For example, a selection signal can be a selection point indicating the position on the invitational content item where the click selecting the invitational content item was received. When the selection point is within a predetermined distance from the edge of the invitational content item, the selection can be determined to be accidental. Alternatively, when the selection point is within a predetermined distance from the center of the invitational content item, a determination can be made that the selection was intentional.

A response to the selection can be based on whether the selection was determined to be accidental or intentional. For example, if the selection was determined to be intentional, the response can be the regular response associated with selection of the invitational content item. For example, secondary content can be presented to the user and the selection can be registered for billing and reporting purposes. Alternatively, if the selection was determined to be accidental, the selection can be ignored. Thus, the selection would not registered for billing purposes and secondary content would not be presented to the user.

FIG. 1 illustrates an exemplary system configuration 100, wherein electronic devices communicate via a network for purposes of exchanging content and other data. As illustrated, multiple computing devices can be connected to communication network 104 and be configured to communicate with each other through use of communication network 104. Communication network 104 can be any type of network, including a local area network ("LAN"), such as an intranet, a wide area network ("WAN"), such as the internet, or any combination thereof. Further, communication network 104 can be a public network, a private network, or a combination thereof. Communication network 104 can also be implemented using any number of communications links associated with one or more service providers, including one or more wired communication links, one or more wireless communication links, or any combination thereof. Additionally, communication network 104 can be configured to support the transmission of data formatted using any number of protocols.

Multiple computing devices can be connected to communication network 104. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIGS. 7A and 7B. To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, invitational content is delivered to client devices $102_1 \ldots 102_n$ (collectively "102") connected to communication network 104 by direct and/or indirect communications with content management system 106. In particular, content management system 106 receives a request for a content package of electronic-invitational content, such as a web page, an application, a game, or media, etc., from one of client devices 102. In the various embodiments, one or more types of invitational content can be combined in a content package. Client devices 102 can be configured to render the received invitational content. This can include display or playing the invitational content appropriately depending on the form of the invitational content. For example, the invitational content can include text, graphics, audio, video, executable code or any combination thereof.

Upon successfully rendering the delivered invitational content, client devices 102 can be configured to send a notification to the content management system 106. In some embodiments the notification can be a web beacon such as an embedded tracking pixel. In some embodiments the operating system of the client devices 102 can be configured to report rendering of the invitational content. In some embodiments, the notification can be cryptographically secured by means such as authentication and digests.

In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. In some embodiments, active invitational content can include secondary views that can be presented to a user upon selection of an initial view of the invitational content. For example, the initial view can be a banner advertisement that, when selected, directs the user to a secondary view such as a multimedia advertisement.

However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, content management system 106 selects the invitational content in response to the request and transmits the assembled invitational content to the requesting one of client devices 102. In some embodiments, content management system 106 has preselected the invitational content before the request is received. Thereafter, content management system 106 assembles a content package of invitational content and causes the content package to be delivered to the requesting one of client devices 102.

Content management system 106 can include content management module 108 that facilitates generation of the assembled content package, which can include invitational content. Specifically, content management module 108 can combine content from one or more primary content providers $109_1 \ldots 109_n$ (collectively "109") and content from one or more invitational content providers $110_1 \ldots 110_n$ (collectively "110") to generate the assembled content package for client devices 102. For example, in the case of a web page being delivered to a requesting one of client devices 102, content management module 108 can assemble a content package by requesting the data for the web page from one of primary content providers 109 maintaining the web page. For the invitational content on the web page provided by invitational content providers 110, content management module 108 can request the appropriate data according to the arrangement between primary and invitational content providers 109 and 110. In some embodiments, client devices 102 can directly request or already have access to primary content from primary content provider 109. In such embodiments, client devices 102 can further request invitational content from content management system 106. Content management system 106 can identify and deliver invitational content appropriate for association with primary content. For example, primary content, such as an application, can already reside or be running on one of client devices 102, and the primary content can direct the client device 102 to request invitational content from content management system 106 to be associated with primary content on the client device 102.

Although primary and invitational content providers 109 and 110 are presented herein as separate entities, this is for illustrative purposes only. In some cases, primary and invitational content providers 109 and 110 can be the same entity. Thus, a single entity can define and provide both the primary and the invitational content.

Although content management module 108 can be configured to request that content be sent directly from primary and invitational content providers 109 and 110, a cached arrangement can also be used to improve performance of content management system 106 and improve overall user experience. That is, content management system 106 can include content database 112 for locally storing/caching content maintained by primary and invitational content providers 109 and 110. The data in content database 112 can be refreshed or updated on a regular basis to ensure that the content in content database 112 is up-to-date at the time of a request from one of client devices 102. However, in some cases, content management module 108 can be configured to retrieve content directly from primary content provider 109 and invitational content provider 110 if the metadata associated with the data in content database 112 appears to be outdated or corrupted.

In some embodiments, the primary and invitational content can be assembled by client devices 102. For example, the primary content and invitational content can be delivered to one of client devices 102 and assembled at client device 102 based on assembly rules dictating how to properly assemble the primary and invitational content together. In some embodiment, the assembly rules can be delivered to client devices 102 by content management system 106.

In the various embodiments, content management system 106 can also include unique user identifier (UUID) database 116 that can be used for managing sessions with the various client devices 102. UUID database 116 can be used with a variety of session management techniques. For example, content management system 106 can implement an HTTP cookie or any other conventional session management method (e.g., IP address tracking, URL query strings, hidden form fields, window name tracking, authentication methods, and local shared objects) for client devices 102 connected to content management system 106 via a substantially persistent network session. However, other methods can be used as well. For example, in the case of handheld communications devices, such as mobile phones, smart phones, tablets, or other types of client devices connecting using multiple or non-persistent network sessions, multiple requests for content from such devices may be assigned to a same entry in UUID database 116. Content management system 106 can analyze the attributes of requesting client devices 102 to determine whether such requests can be attributed to the same user. Such attributes can include device or group-specific attributes.

Content management system 106 can include campaign engine 150, which can be configured to fulfill campaigns for content providers by managing inventory and pricing of invitational content delivered to client devices 102. Content providers can arrange to have their invitational content delivered by content management system 106 based on a pricing scheme based on eliciting a specified user response to the invitational content. For example, in some embodiments the pricing scheme can be arranged so that a content provider is charged a set price for eliciting a user response of selecting the invitation content. Thus, the content provider can be charged a set price each time the invitational content item is selected by a user.

A user selecting an invitational content item can include clicking an invitational content item presented on a client device through use of an input provided by the client device. For example, a user selecting an invitational content item can include a user clicking the invitational content item using a touchscreen of the client device displaying the invitational content item. Alternatively, a user selecting an invitational content item can include a user clicking the invitational content item using a mouse of the client device displaying the invitational content item.

Campaign engine 150 can be configured to record each user selection received by an invitational content item. The recorded selections can be used to calculate a cost accrued by the content provider for delivery of the invitational content items.

A content provider can arrange a campaign in any number of ways. In some embodiments, a content provider can choose a maximum spend limit for a period of time. For example a campaign can be configured so that the cost of delivering the invitational content does not exceed $10,000 over a month. In some embodiments the campaign can be configured to have a spend limit over a large time interval as well as another spend limit for a smaller time interval. For example, a campaign can be allocated to not exceed $10,000 over a month, but further not to exceed $500 in any given day. Campaigns can also be configured to have a minimum amount to be spent per specified time interval. For example, a campaign can have a daily max spend of $1,000 per day as well as a minimum spend of $950 per day. These examples are not meant to be limiting, campaigns can be configured in any number of ways known in the art.

Campaign engine 150 can be arranged to manage the delivery of the invitational content based on the parameters of the campaign. For example, if a content provider has arranged a maximum spend limit of $1,000 per day, campaign engine 150 can monitor the number of selections received by the invitational content item, and upon the spend limit of $1,000 being reached, no longer deliver the item of invitational content associated with the campaign. Rather, campaign engine 150 can select other invitational content items to deliver to a requesting one of client devices 102.

To ensure that a content provider is only charged for invitational content items that are selected intentionally by a user, in some embodiments, client devices 102 can be configured to determine whether a user selection of an invitational content item was accidental or intentional. FIG. 2 illustrates an exemplary system embodiment of client device $102_i$ configured to determine if a user selection of an invitational content item was accidental or intentional. To accomplish this, client device $102_i$ can include selection module 205 configured to determine if a user selection of an invitational content item was accidental or intentional based on various selection signals describing the selection.

In some embodiments, a selection signal can include a selection point on the invitational content item. A selection point can be the location on the invitational content item at which the selection was received. For example, when an invitational content item is selected using a touch screen, the selection point can be the location on the invitational content item that was presented at the position on the touch screen that was touched by the user to select the invitational content item. Alternatively, when an invitational content item is selected using a mouse, the selection point can be the location on the invitational content item where the mouse cursor was located when the mouse was used to select the invitational content item.

A determination can be made as to whether a selection was accidental or intentional based on the selection point of the selection. For example, based on an assumption that selections received at or near the center of an invitational content item are most likely intentional, a selection can be determined to be intentional when the selection point is within a predetermined distance from the center of the invitational content item. Alternatively, a determination can be made that the selection was accidental when the selection point is within a predetermined distance from the edge of the invitational content item.

In some embodiments, the predetermined distance from the edge or center of an invitational content item can be measured in pixels. For example, if a selection point is within 20 pixels of the center of the invitational content item it can be determined that the selection was intentional. As another example, a determination can be made that a selection was accidental if the selection point is within 10 pixels of an edge of the invitational content item. Alternatively, predetermined distance can be measured in any other know measure of distance including metric and standard.

In some embodiments, an invitational content item can be an odd shape, and thus the center of the invitational content item may not be the most suitable measure for determining whether a selection was intentional or accidental. Thus, in some embodiments, a selection can be determined to be intentional if the selection point is a predetermined distance away from an edge of the invitational content item.

In some embodiments, the invitational content items can be broken into multiple zones and a determination can be made as to whether the selection was intentional or accidental based on which zone the selection point is in. For example, an invitational content item can include an inner zone near the center of the invitational content item and an outer zone near the edge of the invitational content item. If the selection point is within the inner zone, a selection module 205 can determine that the selection was intentional. Alternatively, if the selection point is within the outer zone, selection module 205 can determine that the selection was accidental.

In some embodiments, an invitational content item can include a third zone for selections where it cannot be determined based on the selection point if the selection was intentional or accidental. For example, a third zone can be between the outer zone and the inner zone and when the selection point falls within the third zone, selection module 205 can determine that it cannot be discerned whether the selection was intentional or accidental based on the selection point.

In some embodiments, the size and location of the zones can be based on historical data gathered from the user. For example, client device $102_i$ can include user database 210 configured to store data regarding the user, such as the previous selection points from selections made by the user. This data can be used to determine selection point patterns of the user and the zones can be created based on the zones. For example, a right handed user may select invitational content items near the right side of the invitational content item and thus, the selection zones can be adjusted to take into account this tendency of the user. For example, the inner zone can be adjusted to be closer to the right side of the invitational content item and the outer zone near the right side of the invitational content item can be smaller than on the left side of the invitational content item.

In some embodiments, the size and the location of the zones can vary based on contextual data gathered regarding client device $102_i$. For example, the size and location of the zones can vary based on a determined motion of client device $102_i$. The motion of client device $102_i$ can be determined using a gyroscope and/or accelerometer of client device $102_i$. In some embodiments, selection module 205 can adjust the zones when it is determined that client device $102_i$ is not moving or is close to not moving. For example, based on an assumption that a user is likely to be much more accurate when not moving, the zones can be set so that only selections made in a small area near the center of the invitational content item will be determined to be intentional. Alternatively, when the motion of client device $102_i$ indicates that the user is likely walking, the zones can be adjusted to be more forgiving. For example, the size of the zone indicating that the selection was intentional can be larger than when client device $102_i$ is determined to be still. In some embodiments, the zone indicating that the selection was accidental can be removed completely when it is determined that the user is likely walking or running when trying to select the invitational content. Further, in some embodiments, the zone indicating an intentional selection may be adjusted to be larger than the invitational content item itself. For example, selection points just outside the edge of the invitational content item can be determined to be intentional selections of the invitational content item.

FIGS. 3A-3D illustrate determining whether a selection was intentional or accidental based on the selection point of the selection. As illustrated by FIG. 3A, invitational content item 305 is presented along with primary content 310. As shown, a selection is received at selection point 315. Selection point 315 can indicate the location at which a user input selecting invitational content item 305 was received. For example, selection point 315 can be the point at which a user input using a touch screen was received. Alternatively, selection point 315 can be the location of a cursor when invitational content item 305 was clicked using a mouse.

As shown, selection point 315 is near the center of invitational content item 305 and thus was likely made intentionally. Thus it can be determined that the selection made at selection point 315 was intentional.

Figure 3B:
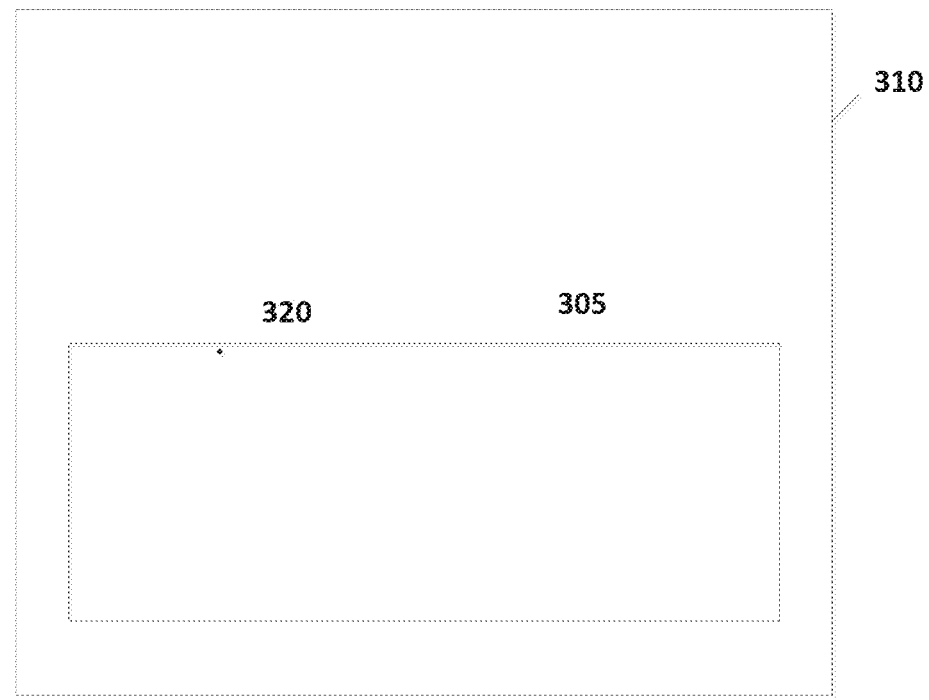

Alternatively, in FIG. 3B, invitational content item 305 was selected at selection point 320 near the edge of invitational content item 305. The selection made at selection point 320 can be determined to be accidental because selection point 320 is near the edge of content item 305 and thus it is likely that the selection was not intended to select the invitational content item.

Figure 3C:
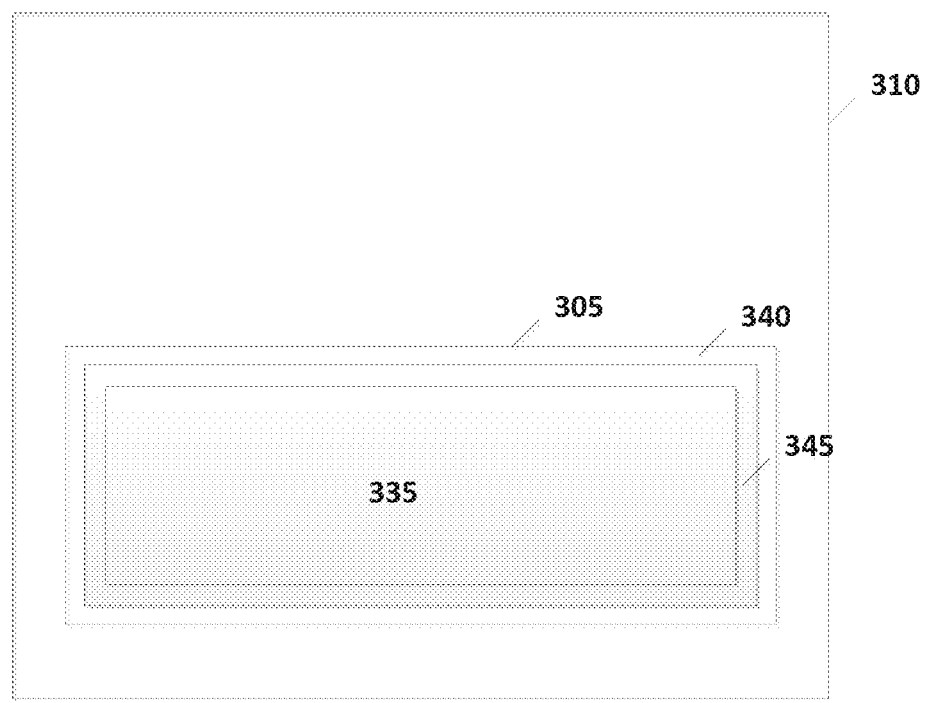

FIG. 3C illustrates invitational content item 305 including 3 zones for determining whether a selection was intentional or accidental. Inner zone 335 can indicate selections that are intentional. For example, if a selection point falls within inner zone 335, a determination can be made that the selection was intentional because it is unlikely that a selection made near the center of invitational content item 305 was accidental. Selections made in outer zone 340 can be determined to be accidental because they are close to the edge of content item 305. Middle zone 345 can indicate an area in which a determination cannot be made from the selection point if the selection was accidental or intentional. For example, middle zone 345 is in between the inner zone 335 and the outer zone 340 so a selection made in middle zone 345 may be accidental or it may be intentional. Selections made in middle zone 345 can be identified as unknown because, based on the selection point alone, a determination cannot be made as to whether the selection was intentional or accidental.

Figure 3D:
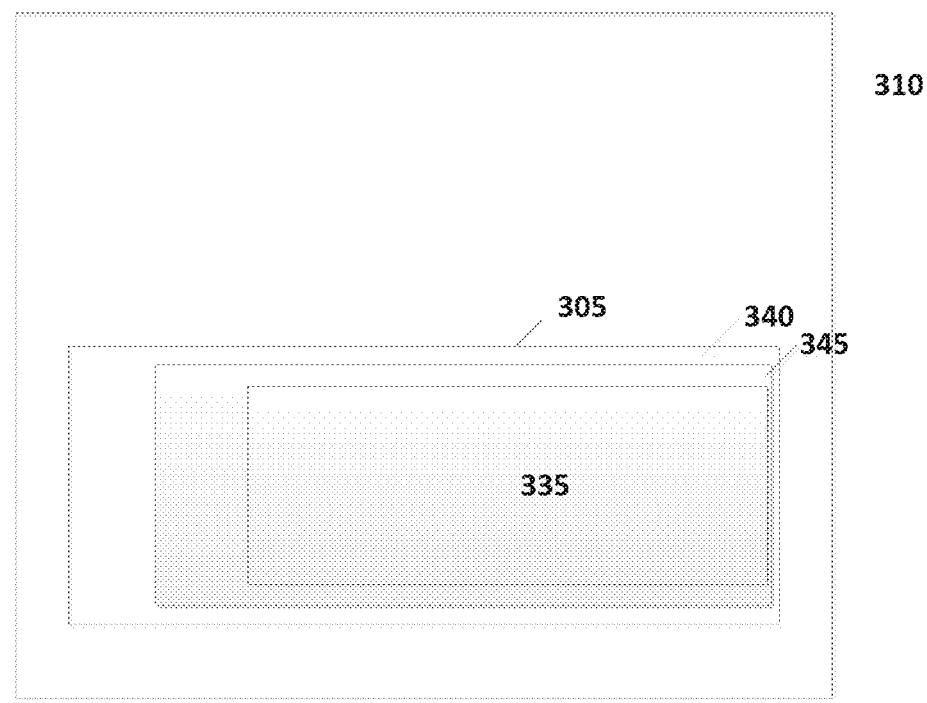

FIG. 3D illustrates invitational content item 305 with the zones adjusted based on user data. As shown, inner zone 335 is shifted to the right and middle zone 345 and outer zone 340 are smaller on the right side of invitational content item 305. This can be the result of user data indicating that the user generally selects invitational content items on the right side. Further, middle zone 345 and outer zone 340 are larger on the left side.

Returning to the discussion of FIG. 2, in some embodiments, a selection signal can include a response time of the selection. A response time can indicate the amount of elapsed time between the invitational content item being presented on client device $102_i$ and the invitational content item being selected by a user.

In some embodiments, selections made within a predetermined response time can be determined to be accidental. For example, selections made almost immediately after presentation of the invitational content item were likely accidental because the user would not have had the time to review the invitational content item and make an informed decision to select the invitational content item. Alternatively, selections made after a predetermined amount of time has elapsed after the invitational content item was presented can be determined to be intentional.

In some embodiments, selections made within a predetermined time range after presentation of the invitational content item can be determined to be intentional, whereas selections not made within the predetermined time range can be determined to be accidental. For example, it can be determined that all selections made after 3 seconds have elapsed after the invitational content item was presented, but prior to 1 minute elapsing, can be determined to be intentional, whereas selections made prior to 3 seconds elapsing and selections made after 1 minute elapsing can be determined to be accidental.

In some embodiments, a selection signal can include a multiple selection count indicating the number of selections of the invitational content item received at client device $102_i$ within a predetermined time period before and after the selection of the invitational content item. In some instances, rapid selection of an invitational content item within a predetermined amount of time can be an indication that the selections are accidental. For example, rapid selections can be the result of a user playing a game that resulted in multiple accidental selections within a short period of time. Accordingly, multiple selections made in short period of time can be determined to be accidental. Similarly, when a selection is made that was not part of a rapid series of selections, a determination can be made that the selection was intentional.

In some embodiments, a selection signal can indicate the context of the selection. The context of the selection can indicate what is occurring on client device $102_i$ at the time the selection is made. In some embodiments, the context can indicate an application or class of application running on client device $102_i$. For example, the context can indicate that a class of application during which a user does not traditionally like to be interrupted, such as a video game, is running on client device $102_i$. This can indicate that the selection was likely accidental and thus a determination can be made that the selection was accidental. Alternatively, the context can indicate that a class of application during which a user does traditionally like to be interrupted, such as a news application, is running on client device $102_i$. This can indicate that the selection was likely intentional and thus a determination can be made that the selection was intentional.

Alternatively, in some embodiments, the context of the selection can indicate the color of the surrounding areas presented near the selected invitational content item. In some instances, a user may accidentally select an invitational content item because the user could not discern the invitational content item from the areas surrounding the invitational content item. Thus, in some embodiments, when the context of the selection indicates that the areas surround the invitational content item are similar in color and/or appearance to the selected invitational content item, a determination can be made that the selection was accidental. Alternatively, when the context of the selection indicates that the areas surrounding the invitational content item are contrasting colors and thus the invitational content item is easily distinguishable from the surrounding areas, the selection can be determined to be intentional.

In some embodiments, the selection signal can indicate the proximity of any selectable or actionable areas presented near the invitational content item. In some instances, a user may accidentally select an invitational content when trying to select or engage with another selectable or actionable area presented near the invitational content item. Thus, in some embodiments, when the selection signal indicates that a selectable or actionable area is presented within a predetermined proximity of the invitational content item, it can be determined that the selection was accidental. Alternatively, when the selection signal indicates that a selectable or actionable area is not presented within a predetermined proximity of the invitational content item, it can be determined that the selection was intentional.

In some embodiments, the proximity of a selectable or actionable area can be compared to a selection point to determine if the selection was intentional or accidental. For example, when a selectable or actionable area is within a predetermined proximity of a selection point, a determination can be made that the selection was accidental. Alternatively, when a selectable or actionable area is not within a predetermined proximity of a selection point, a determination can be made that the selection was intentional.

In some embodiments, a selection signal can indicate data about client device $102_i$. For example, the selection signal can indicate a device motion of client device $102_i$. A device motion can be data indicating the motion, acceleration and/or rotation of client device $102_i$. In some embodiments, a device motion can be determined from a gyroscope and accelerometer of client device $102_i$. Selection module 205 can thus be configured to communicate with a gyroscope and/or accelerometer of client device $102_i$ to determine gather the signal data indicating the device motion.

In some instances, accidental selections of invitational content items occur when a client device, such as a smartphone or tablet PC, is being transported. For example, a user may accidentally select an invitational content item while walking with their smart phone in their hand or pocket. Alternatively, an invitational content item may be accidentally selected when a client device is stored in a back pack and being transported from one location to another. Thus, when the device motion indicates that, at the time of selection, client device $102_i$ was moving or rotating above a specified threshold value, a determination can be made that the selection was accidental.

In addition to device motion, in some embodiments, the selection signal can also indicate the axial configuration of client device $102_i$ when an invitational content item is selected. The axial configuration can indicate the direction client device $102_i$ is facing. For example, the axial configuration can indicate that client device $102_i$ is positioned in a position that might indicate that client device $102_i$ is stored in a user's pants pocket. In some embodiments, when the axial configuration indicates that a selection was received while client device $102_i$ was in a position indicating that client device $102_i$ was in a user's pocket, a determination can be made that the selection was accidental. Alternatively, when the axial configuration indicates that a selection was received while client device $102_i$ was in a position indicating that client device $102_i$ was likely being engaged by a user when a selection was made, a determination can be made that the selection was intentional.

In some embodiments, a selection signal can indicate user preference data of a user associated with client device $102_i$. In some embodiments, user preference data can indicate user entered preferences regarding invitational content. This can include a user's likes and dislikes regarding invitational content or likes and dislikes generally. In some embodiments, client device 102 can include user database 210 configured to store user preference data. Selection module 205 can be configured to communicate with user database 210 to gather the user preference data.

The known preference data of the user can be used to determine whether a selection of an invitational content item was intentional or accidental. For example, when a selected invitational content item is associated with a subject known to be disliked by the user, a determination can be made that the selection was accidental. Alternatively, when a selected invitational content is associated with a subject known to be liked by the user, the selection can be determined to by intentional. As an example, selection on an invitational content item advertising beer can be determined to be accidental when user preference data associated with the user indicates that the user dislikes beer. Alternatively, the selection can be determined to be intentional when user preference data associated with the user indicates that the user likes beer.

In some embodiments, a determination as to whether a selection was accidental or intentional can be based on multiple selections signals. For example, selection module 205 can be configured to calculate a selection score indicating the likelihood that the selection was intentional based on the various selection signals. For example, selection module 205 can assign an individual selection score each selection signal based on whether the selection signal indicates that the selection was likely intentional or likely accidental. The assigned scores can be combined to result in a selection score indicating the overall likelihood that the selection was accidental or intentional.

If, based on the selection score, it is determined that the selection was likely intentional, a determination can be made that the selection was intentional. Alternatively, if, based on the selection score, it is determined that the selection was likely accidental, a determination can be made that the selection was accidental.

In some embodiments, a determination cannot be made as to whether the selection was accidental or intentional. For example, the selection score can be somewhere in between indicating that the selection was accidental or intentional. In these types of instances, a determination can be made that it is unknown whether the selection was intentional or accidental.

In some embodiments, a response to a selection can be based on the determination as to whether the selection was intentional, accidental or unknown. If the selection is determined to be intentional, the selection can be registered normally. For example, the regular post selection experience, such as notifying content management system 106 that the invitational content item was selected, and presenting any secondary content to the user, can be performed in response to the selection. Further, campaign engine 150 can record the selection for billing purposes.

If the selection is determined to be accidental, in some embodiments, the selection can be ignored. Thus, content management system 106 will not be notified that the selection was made and the user will not be presented with the regular post selection experience.

Alternatively, in some embodiments, when a selection is determined to be accidental, the user can be presented with the regular post selection experience, however, campaign module 150 can be configured determine whether to register the selection for billing purposes based on the user's interactions with any presented secondary content. For example, the selection can be registered for billing purposes if it is determined that, based on the user's interactions with the presented post selection experience, that the selection was intentional. If the user has a meaningful interaction with the presented post selection experience, a determination can be made that the selection was in fact intentional and the selection can be registered for billing purposes. Alternatively, if the user does not have a meaningful interaction with the presented post selection experience, a determination can be made that the selection was accidental and the selection can be ignored for billing purposes.

To accomplish this, selection module 205 can be configured to monitor the user's interactions with any presented secondary content resulting from the selection, for a predetermined amount of time after the selection. For example, selection module 205 can monitor the user's interactions for 10 seconds. If during the predetermined amount of time, selection module 205 detects input indicating the user is having a meaningful interaction with the displayed content, i.e. the user is actively viewing the content and navigating through the content, selection module 205 can determine that the selection was intentional. Selection module 205 can then transmit a message to content management system 106 to register the selection for billing purposes.

Alternatively, if selection module 205 does not detect meaningful activity, i.e. the user has not selected or engaged with the presented content, selection module 205 can determine that the selection was accidental. Selection module 205 can then send a message to content management system 106 that the selection was accidental and thus the selection should not be counted for billing purposes.

If selection module 205 determines that it is unknown whether a selection was intentional or accidental, in some embodiments, selection module 205 can be configured to prompt the user to indicate whether the selection was intentional or accidental. For example, selection module 205 can be configured to present interstitial content, such as a splash screen, prompting the user to select a button to continue. If a selection is not received on the continue button within a predetermined amount of time, selection module 205 can determine that the selection was accidental and the selection of the invitational content item can be ignored. Alternatively, if a selection is received on the continue button, selection module 205 can determine that the selection of the invitational content item was intentional and the selection of the invitational content item can be registered normally.

Alternatively selection module 205 can handle unknown selections similarly to selections determined to be accidental. For example, in some embodiments, selection module 205 can ignore unknown selections. Alternatively, secondary content can be presented to the user and monitored by selection module 205 for meaningful interaction by the user to determine whether the selection was intentional or accidental.

FIG. 4 illustrates as exemplary method embodiment of determining whether a selection of an invitational content item was intentional or accidental. As shown, the method begins at block 405 where selection of an invitational content item is received. In some embodiments, a selection can be made by a user using an input device of a client device displaying the invitational content item. For example, a user can make the selection using a touch screen of the client device.

At block 410 a score is assigned to various selections signals describing the selection. The score for each selection signal can be assigned based on whether the selection signal indicates that it is likely that the selection was intentional or accidental. In some embodiments, a positive score can be assigned to a selection signal that indicates that a selection was intentional, whereas as negative score can be assigned to selection signal that indicates that the selection signal was accidental. Further, in some embodiments, a score of zero can be assigned to a selection signal when the selection signal does not indicate whether the selection was accidental or intentional.

Upon assigning a score to the various selection signals, the method continues to block 415 where a selection score is calculated based on the scores assigned to the various selection signals. In some embodiments, the selection score can be calculated by summing the scores assigned to the various selection signals. Alternatively, in some embodiments, varying weights can be applied to the assigned scores prior to calculating the selection score.

Once a selection score has been calculated, the method continues to block 420 where a determination is made as to whether the selection was accidental or intentional based on the selection score. In some embodiments, predetermined selection score ranges can be used to determine whether a selection is intentional, accidental or unknown. For example, a predetermined selection score range can indicate a set of selection scores and whether a selection associated with a selection score within the selection score range should be determined to be accidental, intentional or unknown. The selection score can be compared to the predetermined score ranges to determine which predetermined score range the selection score falls within. The selection can then be determined to have the outcome associated with the predetermined score range.

Upon determining whether the selection was intentional, accidental or unknown, the method continues to block 425 where a response is made dependent on whether the selection was determined to be intentional, accidental or unknown. The method then ends.

Figure 5:
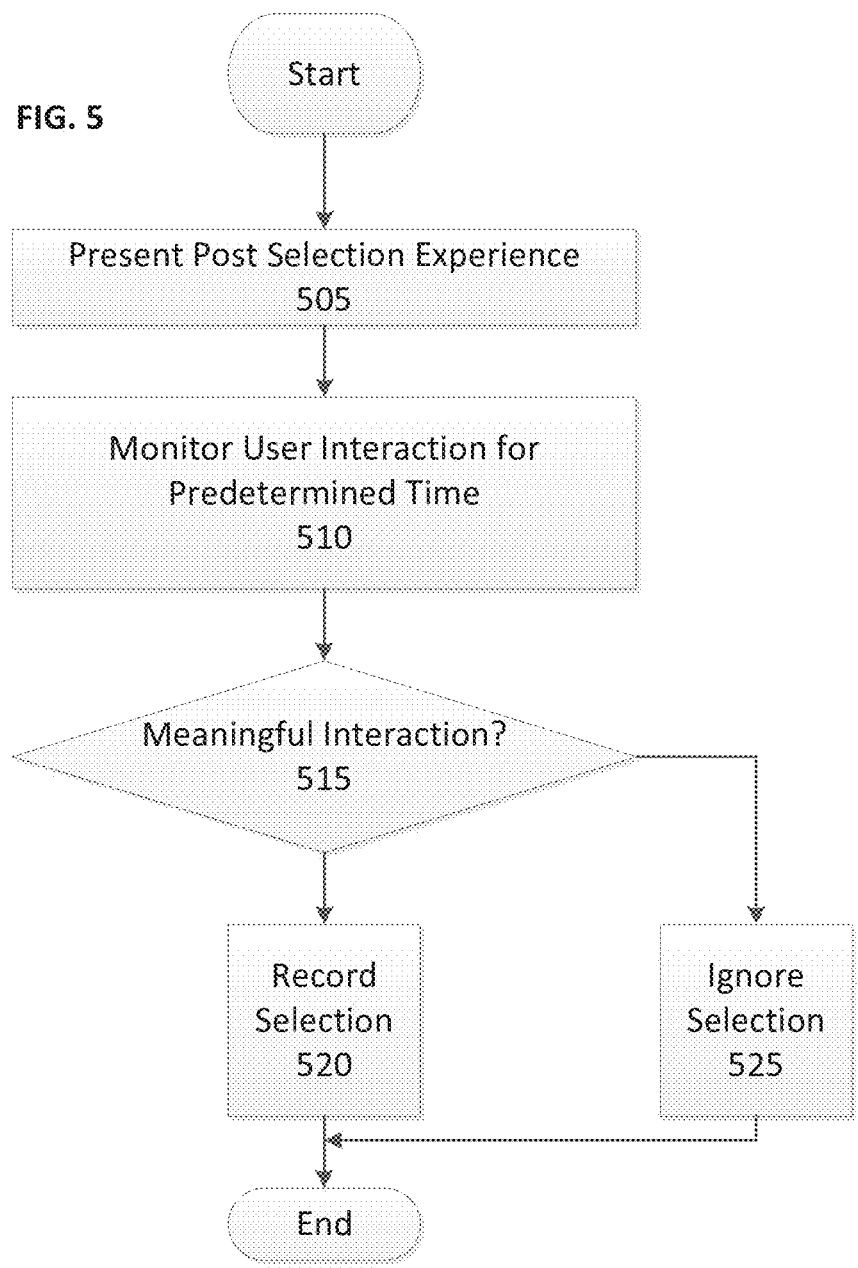
FIG. 5 illustrates an exemplary method embodiment of responding to a selection determined to be accidental.

FIG. 5 illustrates an exemplary method embodiment of responding to a selection determined to be accidental. As illustrated, the method begins at block 505 where the post-selection experience is presented to the user. This can include requesting a presenting any secondary content that is presented when the invitational content item is selected intentionally.

Upon presenting the post-selection experience to the user, the method continues to block 510 where the user's interaction with the presented post-selection experience is monitored for a predetermined amount of time. For example, user interaction such as a user clicking or interacting with any elements displayed as part of the post-selection experience can be monitored for 10 seconds.

The method then continues to block 515 where a determination is made as to whether the interaction was meaningful. For example, if a predetermined number of interactions indicating that the user was actively engaging with the post-selection experience were detected, a determination can be made that the user's interaction was meaningful. Alternatively, if less than the predetermined number of interactions were recorded, it can be determined that the user's interaction was not meaningful.

If at block 515 it is determined that the user's interactions were meaningful, the method can continue to block 520 where the selection can be recorded as an intentional selection. For example, the selection can be recorded for billing and reporting purposes. The method then ends.

Alternatively, if at block 515 it is determined that the user's interactions were not meaningful; the method can continue to block 525 where the selection can be ignored. Thus, the selection will not be recorded for billing and reporting purposes. The method then ends.

Although the method illustrated in FIG. 5 is presented as a method of responding to a selection determined to be accidental, this is just one possible use of this method. For example, in some embodiments, the illustrated method can be used in response to an unknown selection, i.e. a selection where, based on the selection signals, it cannot be determined whether the selection was accidental or intentional.

FIG. 6 illustrates an exemplary method embodiment of responding to a selection. In some embodiments, the illustrated method can be used to respond to an unknown selection. In some embodiments, the illustrated method can be used to response to selection determined to be accidental.

As illustrated, the method begins at block 605 interstitial content, such as a splash screen, is presented. The interstitial content can include a continue button prompting the user to select the button to continue. The method then continues to block 610 where a determination is made as to whether a selection is received on the continue button. If at block 610 a selection of the continue button is received, the method continues to block 615 where the post-selection experience is presented to the user. The method then continues to block 620 where the selection is registered for billing and/or reporting purposes. The method then ends.

If at block 610 a selection of the continue button is not received, for example within a predetermined amount of time, the method continues to block 625 where the selection of the invitational content item is ignored. Thus, the selection is not recorded for billing purposes and the user is not presented with the post-selection experience. The method then ends.

Figure 7A:
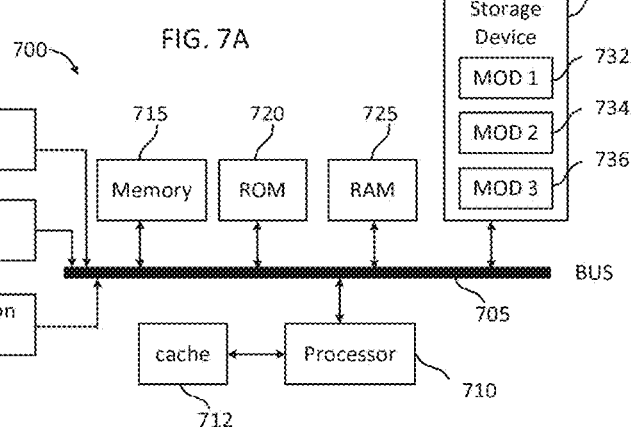
FIGS. 7A and 7B illustrate exemplary possible system embodiments.
Figure 7B:
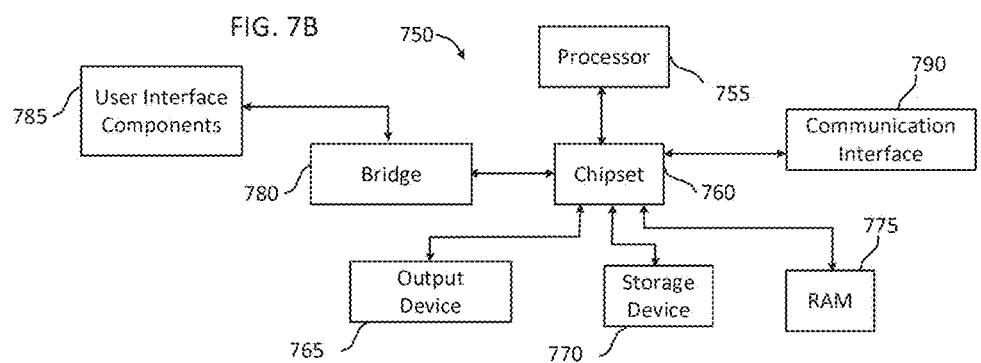

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving an input indicating a first selection of an invitational content item presented on a client device, wherein the input is detected at a location within a selectable area corresponding to the invitational content item;
determining whether the first selection was accidental or intentional based on a selection score for the first selection, the selection score being based on at least two selection signals describing the first selection that are combined to yield the selection score;
wherein a first selection signal of the at least two selection signals includes a selection point indicating a position on the invitational content item where the first selection was registered, the first selection signal being given a low selection score when the selection point is within a predetermined distance of an edge of the invitational content item, or a high selection score when the selection point is within a predetermined distance from the center of the invitational content item, where a selection score below a predetermined value indicates an accidental first selection;
wherein a second selection signal of the at least two selection signals includes a device motion of the client device within an inertial frame of reference, and determining whether the first selection was accidental or intentional includes when the device motion is greater than a predetermined threshold, giving the second selection signal a low score; and
upon a determination that the first selection was accidental, ignoring the input.

2. The method of claim 1, further comprising:
upon a determination that the first selection was intentional, recording the first selection for billing purposes.

3. The method of claim 1, wherein determining whether the first selection was accidental or intentional includes:
when the selection point is within a predetermined inner zone of the invitational content item, the first selection signal is given a high score, and when the selection score is greater than a predetermined value determining that the first selection was intentional.

4. The method of claim 1, wherein a third selection signal of the at least two selection signals includes a selection time indicating an amount of elapsed time between presentation of the invitational content item on the client device and the first selection, and determining whether the first selection was accidental or intentional includes:
when the selection time is shorter than a predetermined amount of time, giving the third selection signal a low score.

5. The method of claim 4, wherein determining whether the first selection was accidental or intentional includes:
when the selection time is longer than the predetermined amount of time, giving the third selection signal a high score.

6. The method of claim 1, wherein a third selection signal of the at least two selection signals includes a selection time indicating an amount of elapsed time between the first selection and a second selection of the invitational content item, and determining whether the first selection was accidental or intentional includes:
when the selection time is less than a predetermined amount of time, giving the third selection signal a low score.

7. The method of claim 6, wherein determining whether the first selection was accidental or intentional includes:
when the selection time is longer than a predetermined amount of time, giving the third selection signal a high score.

8. The method of claim 1, comprising:
displaying additional content in response to a second selection where the selection score indicates that the first selection was intentional;
detecting user activity on the client device within a predetermined time after the second selection and during the display of the additional content;
determining that the user activity does not amount to a meaningful interaction with additional content within the predetermined time; and
in response to determining that the user activity does not amount to a meaningful interaction with the additional content, not informing an advertising service that the second selection was accidental.

9. A client device comprising:
a processor; and
a memory containing instructions that, when executed, cause the processor to:
receive an input indicating a first selection of an invitational content item presented on a client device, wherein the input is detected at a location within a selectable area corresponding to the invitational content item;
determine whether the first selection was accidental or intentional based on a selection score for the first selection, the selection score being based on at least two selection signals describing the first selection;
wherein a first selection signal of the at least two selection signals includes a selection point indicating a position on the invitational content item where the first selection was registered, the first selection signal being given a low selection score when the selection point is within a predetermined distance of an edge of the invitational content item, where a selection score below a predetermined value indicates an accidental first selection;
wherein a second selection signal includes a selection time indicating an amount of elapsed time between the first selection and a second selection of the invitational content item, and determining whether the first selection was accidental or intentional includes when the selection time is less than a predetermined amount of time, giving the second selection signal a low score; and
upon a determination that the first selection was accidental, ignore the input.

10. The client device of claim 9, further wherein the instructions further cause the processor to:
upon a determination that the first selection was intentional, record the first selection for billing purposes.

11. The client device of claim 9, wherein determining whether the first selection was accidental or intentional includes:
when the selection point is within a predetermined inner zone of the invitational content item, the first selection signal is given a high score, and when the selection score is greater than a predetermined value determining that the first selection was intentional.

12. The client device of claim 9, wherein a third selection signal includes a selection time indicating an amount of elapsed time between presentation of the invitational content item on the client device and the first selection, and determining whether the first selection was accidental or intentional includes:
when the selection time is shorter than a predetermined amount of time, giving the third selection signal a low score.

13. The client device of claim 12, wherein determining whether the first selection was accidental or intentional includes:
when the selection time is longer than the predetermined amount of time, giving the third selection signal a high score.

14. The client device of claim 9, wherein determining whether the first selection was accidental or intentional includes:
when the selection time is longer than a predetermined amount of time, giving the second selection signal a high score.

15. The client device of claim 9, wherein a third selection signal includes a device motion of the client device within an inertial frame of reference, and determining whether the first selection was accidental or intentional includes:
when the device motion is greater than a predetermined threshold, giving the second selection signal a low score.

16. A non-transitory computer-readable medium containing instructions that, when executed by a computing device, cause the computing device to:
receive an input indicating a first selection of an invitational content item presented on a client device, wherein the input is detected at a location within a selectable area corresponding to the invitational content item;
determine whether the first selection was accidental or intentional based a selection score for the first selection, the selection score being based on at least two selection signals describing the first selection that are combined to yield the selection score;
wherein a first selection signal of the at least two selection signals includes a selection point indicating a position on the invitational content item where the first selection was registered, the first selection signal being given a low selection score when the selection point is within a predetermined distance of an edge of the invitational content item, or a high selection score when the selection point is within a predetermined distance from the center of the invitational content item, where a selection score below a predetermined value indicates an accidental first selection;
wherein a second selection signal includes a selection time indicating an amount of elapsed time between the first selection and a second selection of the invitational content item, and determining whether the first selection was accidental or intentional includes when the selection time is less than a predetermined amount of time, giving the second selection signal a low score; and
upon a determination that the first selection was accidental, ignore the input.

17. The non-transitory computer-readable medium of claim 16, wherein the instructions further cause the computing device to:
upon a determination that the first selection was intentional, record the first selection for billing purposes.

18. The non-transitory computer-readable medium of claim 16, wherein determining whether the first selection was accidental or intentional includes:
when the selection point is within a predetermined inner zone of the invitational content item, the first selection signal is given a high score, and when the selection score is greater than a predetermined value determining that the first selection was intentional.

19. The non-transitory computer-readable medium of claim 16, wherein a third selection signal includes a selection time indicating an amount of elapsed time between presentation of the invitational content item on the client device and the first selection, and determining whether the first selection was accidental or intentional includes:
   when the selection time is shorter than a predetermined amount of time, giving the third selection signal a low score.

20. The non-transitory computer-readable medium of claim 19, wherein determining whether the first selection was accidental or intentional includes:
   when the selection time is longer than the predetermined amount of time, giving the third selection signal a high score.

21. The non-transitory computer-readable medium of claim 16, wherein a third selection signal includes a device motion of the client device within an inertial frame of reference, and determining whether the first selection was accidental or intentional includes:
   when the device motion as detected by a gyroscope or accelerometer is greater than a predetermined threshold, giving the third selection signal a low score.

* * * * *